(12) United States Patent
Gray et al.

(10) Patent No.: US 8,407,580 B2
(45) Date of Patent: Mar. 26, 2013

(54) METHOD AND SYSTEM FOR PRESENTING INPUT EXPRESSIONS AND EVALUATIONS OF THE INPUT EXPRESSIONS ON A WORKSPACE OF A COMPUTATIONAL SYSTEM

(75) Inventors: Theodore W. Gray, Champaign, IL (US); Stephen Wolfram, Champaign, IL (US)

(73) Assignee: Wolfram Research, Inc., Champaign, IL (US)

( * ) Notice: Subject to any disclaimer, the term of this patent is extended or adjusted under 35 U.S.C. 154(b) by 641 days.

(21) Appl. No.: 11/697,989

(22) Filed: Apr. 9, 2007

(65) Prior Publication Data

US 2008/0250347 A1 Oct. 9, 2008

(51) Int. Cl.
*G06F 3/048* (2006.01)
(52) U.S. Cl. .................. 715/219; 715/220; 715/808
(58) Field of Classification Search .................. 715/808, 715/219, 220
See application file for complete search history.

(56) References Cited

U.S. PATENT DOCUMENTS

| | | | | |
|---|---|---|---|---|
| 6,282,551 | B1 * | 8/2001 | Anderson et al. | 715/209 |
| 7,490,031 | B1 * | 2/2009 | Qiu | 703/22 |
| 2003/0193484 | A1 * | 10/2003 | Lui et al. | 345/173 |
| 2004/0176923 | A1 * | 9/2004 | Shank et al. | 702/108 |
| 2008/0143746 | A1 * | 6/2008 | Irons | 345/629 |
| 2008/0189718 | A1 * | 8/2008 | Gulley et al. | 718/107 |

* cited by examiner

*Primary Examiner* — Andrea Leggett
(74) *Attorney, Agent, or Firm* — Marshall, Gerstein & Borun LLP

(57) ABSTRACT

In a method for presenting information, an interactive document, for example, may be created that includes both an input expression and a result generated by evaluating the input expression, and where the input expression can be selectively hidden. This may permit "decluttering" of the document so that it may be easier to follow. At the same time, user interface mechanisms allow a viewer to reveal the input expression if the viewer desires to see the input expression. In this method, an input expression and a result corresponding to an evaluation of the input expression are presented on a workspace associated with a computational software application. Additionally, a first user interface mechanism associated with the input expression is presented on the workspace. In response to an activation of the first user interface mechanism, the input expression may be hidden on the workspace, while the result is presented on the workspace.

22 Claims, 8 Drawing Sheets

METHOD AND SYSTEM FOR PRESENTING INPUT EXPRESSIONS AND EVALUATIONS OF THE INPUT EXPRESSIONS ON A WORKSPACE OF A COMPUTATIONAL SYSTEM

TECHNICAL FIELD

This disclosure generally relates to computational software applications, and more particularly to techniques for hiding and revealing on a workspace input expressions used to generate results displayed on the workspace.

DESCRIPTION OF THE RELATED ART

This disclosure will refer to a particular implementation of these techniques in the MATHEMATICA® software system available from Wolfram Research, Inc. The methods themselves are more general and could be implemented in a variety of software environments. To understand the illustrations, however, requires some familiarity with the MATHEMATICA® environment.

MATHEMATICA® is a powerful computational tool that can evaluate general symbolic expressions, as well as mathematical and numeric expressions. A unifying feature of MATHEMATICA® is that everything is internally represented as a symbolic expression, with all more specific data types treated as special cases—symbols to which additional rules apply. MATHEMATICA® is an interpreted language, with a notion of "evaluation" of symbolic expressions. Evaluation consists in applying to any symbolic expression all transformation rules that fit that expression.

In the MATHEMATICA® software system, a user can create interactive electronic documents referred to as "notebooks." Various expressions, including numeric and symbolic expressions, can be entered into a notebook via a keyboard, for example, and a user can cause the expression to be evaluated. Some expressions may be used to create graphical displays in a notebook. One example is a built-in function Plot. A user could type into the notebook the expression "Plot[y^2, {y, 0, 5}]", and the MATHEMATICA® software system evaluates the expression "Plot[y^2, {y, 0, 5}]" to generate a plot of the function $y^2$ versus the variable y between y=0 to y=5. The generated plot is then displayed in the notebook. The MATHEMATICA® software system provides other built-in functions for creating graphical displays such as ContourPlot, DensityPlot, Plot3D, ParametricPlot, ParametricPlot3D, etc. Further, built-in functions are provided for displaying tables and matrices.

Using the MATHEMATICA® software system, one can create a presentation or an interactive paper. For example, text can be added to notebooks in addition to computational input expressions and outputs. Also, text formatting, styles, page formatting, etc. can be applied. Titles, section headers, etc., and hyperlinks can be added. Thus, notebooks can be made to appear as much like electronic equivalents of traditional books or printed publications as desired.

DETAILED DESCRIPTION

Figure 1:
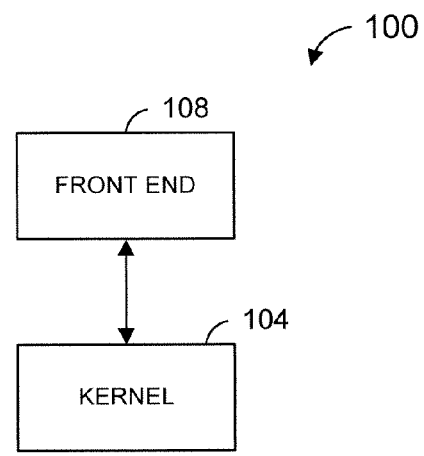
FIG. 1 is a high level block diagram of an example computational software system in which methods and techniques described herein may be implemented.

Example methods are described below that, at least in some implementations, may permit the creation of an interactive document that includes both an input expression and a result generated by evaluating the input expression, and where the input expression can be selectively hidden. This may permit "decluttering" of the document so that it may be easier to follow. At the same time, graphical user interface (GUI) mechanisms may allow a viewer to reveal the input expression if the view desires to see the input expression. In the context of the MATHEMATICA® software system, and merely as an illustrative example, a notebook may include an input expression to generate a plot as well as an image of the plot, but where the input expression may selectively be hidden and revealed using GUI mechanisms.

One of the disclosed embodiments is directed to a method for presenting information, which may include presenting an input expression on a workspace associated with a computational software application, and presenting on the workspace a result corresponding to an evaluation of the input expression. The method also may include presenting on the workspace a first user interface mechanism associated with the input expression, and hiding on the workspace the input expression, while presenting on the workspace the result, in response to an activation of the first user interface mechanism. Additionally, the method may include presenting on the workspace a second user interface mechanism associated with the input expression, and presenting on the workspace the input expression in response to an activation of the second user interface mechanism.

Another of the disclosed embodiments is directed to a computer readable medium having stored thereon machine executable instructions. The machine executable instructions may be capable of causing the machine to present an input expression on a workspace associated with a computational software application, and present on the workspace a result corresponding to an evaluation of the input expression. The machine executable instructions additionally may be capable of causing the machine to present on the workspace a first user interface mechanism associated with the input expression, and hide on the workspace the input expression, while presenting on the workspace the result, in response to an activation of the first user interface mechanism. Further, the machine executable instructions may be capable of causing the machine to present on the workspace a second user interface mechanism associated with the input expression, and present on the workspace the input expression in response to an activation of the second user interface mechanism.

Still another of the disclosed embodiments is directed to another method for presenting information. The method may comprise presenting an input cell on a workspace associated with a computational software application, the input cell including an input expression, and presenting on the workspace an output cell including a result corresponding to an evaluation of the input expression. Also, the method may comprise presenting on the workspace a first user interface mechanism associated with the input cell, and hiding on the workspace the input cell, while presenting on the workspace the output cell, in response to an activation of the first user interface mechanism. Further, the method may comprise presenting on the workspace a second user interface mechanism associated with the input cell, and presenting on the workspace the input cell in response to an activation of the second user interface mechanism.

Still another of the disclosed embodiments is directed to another computer readable medium having stored thereon machine executable instructions. The machine executable instructions may be capable of causing the machine to present an input cell on a workspace associated with a computational software application, the input cell including an input expression, and present on the workspace an output cell including a result corresponding to an evaluation of the input expression. Also, the machine executable instructions may be capable of causing the machine to present on the workspace a first user interface mechanism associated with the input cell, and hide on the workspace the input cell, while presenting on the workspace the output cell, in response to an activation of the first user interface mechanism. Additionally, the machine executable instructions may be capable of causing the machine to present on the workspace a second user interface mechanism associated with the input cell, and present on the workspace the input cell in response to an activation of the second user interface mechanism.

Example Environment

FIG. 1 is a high level block diagram of an example system 100 in which methods and techniques to be described below may be implemented. In particular, the system 100 comprises a kernel 104 in data communication with a front end 108. In general, the kernel 104 may comprise software components that perform computations such as numeric computations, symbolic computations, graphic computations, etc. The front end 108 may comprise software components that handle interaction with a user. For example, the front end 108 may include software configured to permit the user to enter expressions to be evaluated by the kernel 104, to permit a user to initiate evaluations of expressions, to display results of evaluations to the user, etc.

The kernel 104 and the front end 108 may be implemented on a same computing system or on different computing systems that are communicatively coupled to one another. Thus, the kernel 104 and the front end 108 may communicate via a communication link that comprises one or more of procedure calls, messages, a proprietary application programming interface (API) (e.g., the API provided by MATHLINK® software available from Wolfram Research, Inc.), etc. Additionally, if the kernel 104 and the front end 108 are implemented on different computing systems, the kernel 104 and the front end 108 may communicate via one or more of a local area network (LAN), a wide area network (WAN), the Internet, a point-to-point communication link, a wired communication link, a wireless communication link, etc.

The front end may include an interactive document referred to as a notebook similar to those often used with MATHEMATICA® software systems. A notebook may include input to be sent to the kernel 104 and output received from the kernel, as well as text, graphics, palettes, etc. A notebook may include menus and graphical tools for creating and reading notebook documents and for sending information to and receiving information from the kernel 104.

Figure 2:
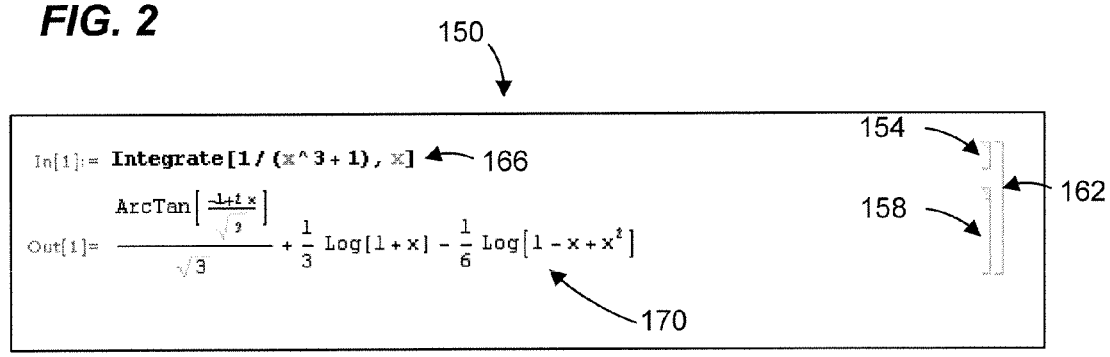
FIG. 2 is an illustration of an example interactive document that may used with a computational software system.

FIG. 2 is an illustration of a portion of an example notebook 150. A notebook may comprise a structured interactive document organized into a sequence of cells. Each cell may contain material of a definite type (e.g., text, graphics, sounds, an expression, etc.). When a notebook is displayed on a screen of a computing system, the extent of each cell may be indicated by a bracket located to a side of the cell. Referring to FIG. 2, brackets 154 and 158 indicate cells of the notebook 150. A bracket 162 indicates that the cells corresponding to the brackets 154 and 158 are related, as will be described in more detail below.

A user can cause information in a cell to be sent to the kernel 104 as input by pressing "Enter" or "Return" while holding down the "Shift" key after a cursor has been placed in the cell. The kernel 104 then evaluates the input to generate an output. The kernel 104 may then send the generated output back to the front end 108. In response, the front end 108 may create one or more new cells in the notebook to display this output. Referring to FIG. 2, an expression 166 corresponds to an input sent to the kernel 104 and an expression 170 corresponds to an output generated by the kernel 104 and sent back to the front end 108. The bracket 154 indicates the cell corresponding to the expression 166 and the bracket 158 indicates the cell corresponding to the expression 170. As described above, the bracket 162 indicates that the cells corresponding to the brackets 154 and 158 are related. In particular, the cell corresponding to the bracket 158 includes an output that is an evaluation of contents of the cell corresponding to the bracket 154.

In notebooks used with MATHEMATICA® software systems, the front end 108 labels each line of input with "In[n]:=" and labels each line of output with "Out[n]=", where n indicates the nth input to the kernel 104 or the output generated by the kernel 104 in response to the nth input.

Alternatively, the front end 108 may comprise a text-based interface in which text typed on a keyboard of a computing system is sent directly to the kernel 104. With a text-based interface, a user may interact with the kernel 104 by typing successive lines of input, and getting back from the kernel 104 successive lines of output displayed on a display screen of the computing system. For example, a prompt of the form "In [n]:= " may be displayed on the display screen to indicate to a user that the kernel 104 is ready to receive input. After the input is typed in and sent to the kernel 104, the kernel 104 may process the input, generate an output, and send that output for display on the display screen with a label of the form "Out [n]=".

In some implementations, the front end 108 may be omitted. For example, a software program that does not interface with a user may communicate with the kernel 104 in a manner similar to communications between the kernel 104 and the front end 108 discussed above. This may comprise interaction via an API (e.g., the API provided by MATHLINK® software), via files, via an extensible markup language (XML), etc.

The kernel 104 may be capable of evaluating different kinds of computations such as numeric computations, symbolic computations (e.g., algebraic computations, integrations, derivatives, etc.), graphic computations, etc. Referring again to FIG. 2, the expression 158 is a symbolic expression. The kernel 104 evaluated the expression 166 and generated an output expression 170 that is also symbolic. The kernel 104 may represent different types of computations to be evaluated in a common format which may be referred to as an "expression."

The kernel 104 may be configured to perform symbolic calculations such as symbolic integration. Such symbolic calculations may be implemented by performing systematic procedures that may not correspond to how a person might perform a symbolic procedure "by hand". Such systematic procedures may include case specific procedures as well as general procedures.

In FIG. 1, a single kernel 104 and a single front end 108 are shown. One of ordinary skill in the art will recognize that multiple kernels 104 and/or multiple front ends 108 may be utilized. For example, a single front end 108 may communicate with a plurality of kernels 104. For instance, one front end 108 may interact with a first kernel 104 until a time T, cease interaction with the first kernel 104, and then begin interacting with a second kernel 104 after the time T. Also, one front end 108 may communicate with a plurality of kernels during a single time period. Similarly, one kernel 104 may interact with multiple front ends 108. One of ordinary skill in the art will recognize many other variations.

Although the system 100 was described above as optionally being capable of evaluating non-numeric expressions such as symbolic expressions, it is to be understood that in some implementations, the system 100 may not be capable of evaluating one or more of symbolic expressions, algebraic expressions, graphic expressions, etc.

Further, the system 100 is only one example of a system that may be utilized to implement methods and techniques described below. Other example systems include a spreadsheet application, a simulation application, a control system application, an instrument application, a game application, etc.

Hiding Input Cells

Examples of user interface presentation techniques that can be used with various types of computing software applications will now be described. These techniques will be described in the context of the MATHEMATICA® software system. It is to be understood, however, that these techniques can be used in other contexts and with other computational software systems as well. In the context of the MATHEMATICA® software system, the described techniques may help users to prepare notebooks that can be readily modified to make them more readable, less cluttered, etc. Generally speaking, the described techniques permit a user to readily hide input expressions that are used to generate outputs displayed in the notebook.

Figure 3A:
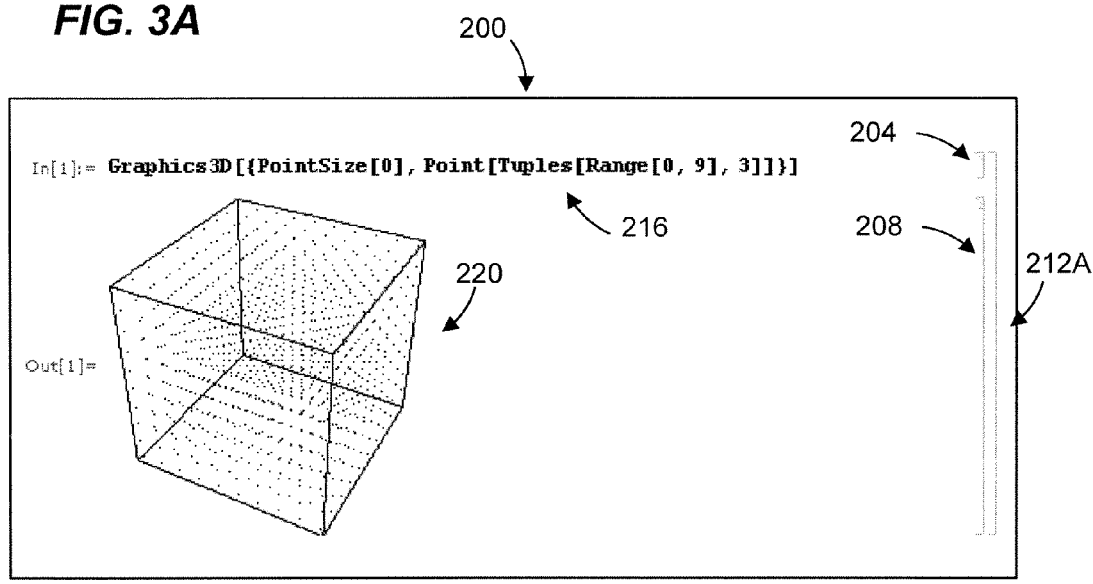
FIG. 3A is an illustration of an example interactive document having a graphical user interface mechanism that can be used to hide an input expression.

FIG. 3A is an illustration of a portion of an example notebook 200. The notebook 200 includes an input cell indicated by a bracket 204 and an output cell indicated by a bracket 208. A bracket 212A indicates that the cells corresponding to the brackets 204 and 208 are related. The input cell indicated by the bracket 204 includes an input expression 216. The kernel 104 evaluates the expression 216 to generate a 3D graphic of points corresponding to all possible 3-tuples from the list 0, 1, 2, . . . , 9. In other words, the 3D graphic generated by the kernel is a plot of all of the points [0, 0, 0], [0, 0, 1], [0, 0, 2], . . . , [9, 9, 9]. An evaluation of the expression 216 is included in the output cell indicated by the bracket 208. In particular, the output cell includes a graphic 220.

Figure 3B:
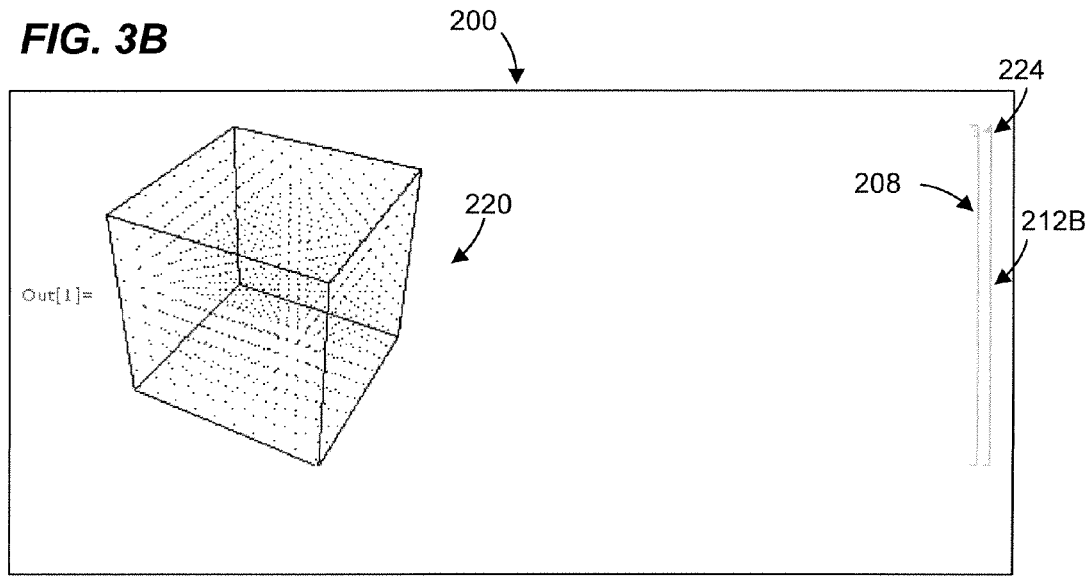
FIG. 3B is an illustration of the example interactive document of FIG. 3A after the graphical user interface mechanism was activated.

In the example notebook 200, the bracket 208 is a graphical user interface (GUI) mechanism that is associated with the input expression 216. A user can activate the bracket 208 by, for example, double clicking on the bracket 208 using a pointer and a mouse, a trackball, a touch pad, etc. In response to activation of the bracket 208, the cell corresponding to the bracket 204 (i.e., the cell including the input expression 216) is hidden in the notebook 200. In this sense at least, the bracket 208 is associated with the input expression 216. Additionally, the bracket 208 is associated with the graphic 220 at least because the bracket is associated with the input expression 216 which is in turn associated with the graphic 220, and/or because it indicates the output cell that includes the graphic 220. FIG. 3B is an illustration of the portion of the example notebook 200 after a user activated the bracket 208. As can be seen in FIG. 3B, the cell corresponding to the bracket 204, as well as the bracket 204 itself, is no longer visible in the notebook 200. For instance, the expression 216 is no longer visible. In this manner, a user can readily hide the input expression needed to generate the graphic 220. This may be useful, for example, if an author of the notebook wants viewers to focus their attention on the output as opposed to what was used to generate the output. Additionally or alternatively, this may be useful, for example, if a user wants to reduce the size of the notebook (e.g., in page size, window size, screen size, number of pages, etc.).

In addition, the notebook 200 as illustrated in FIG. 3B includes a bracket 212B. The bracket 212B includes an indicator 224 that indicates there is a hidden input cell associated with the graphic 220. Additionally, the bracket 212B is a GUI mechanism that may be activated by, for example, double clicking on the bracket 212B using a pointer and a mouse, a trackball, a touch pad, etc. In response to activation of the bracket 212B, the cell corresponding to the bracket 204 (i.e., the cell including the input expression 216) may be revealed in the notebook 200. For example, the notebook 200 may then appear as in FIG. 3A. In this sense at least, the bracket 212B is associated with the input expression 216. Additionally, the bracket 212B is associated with the graphic 220 at least because the bracket 212B is associated with the input expression 216 which is in turn associated with the graphic 220, and/or because it indicates the output cell that includes the graphic 220.

Figure 4:
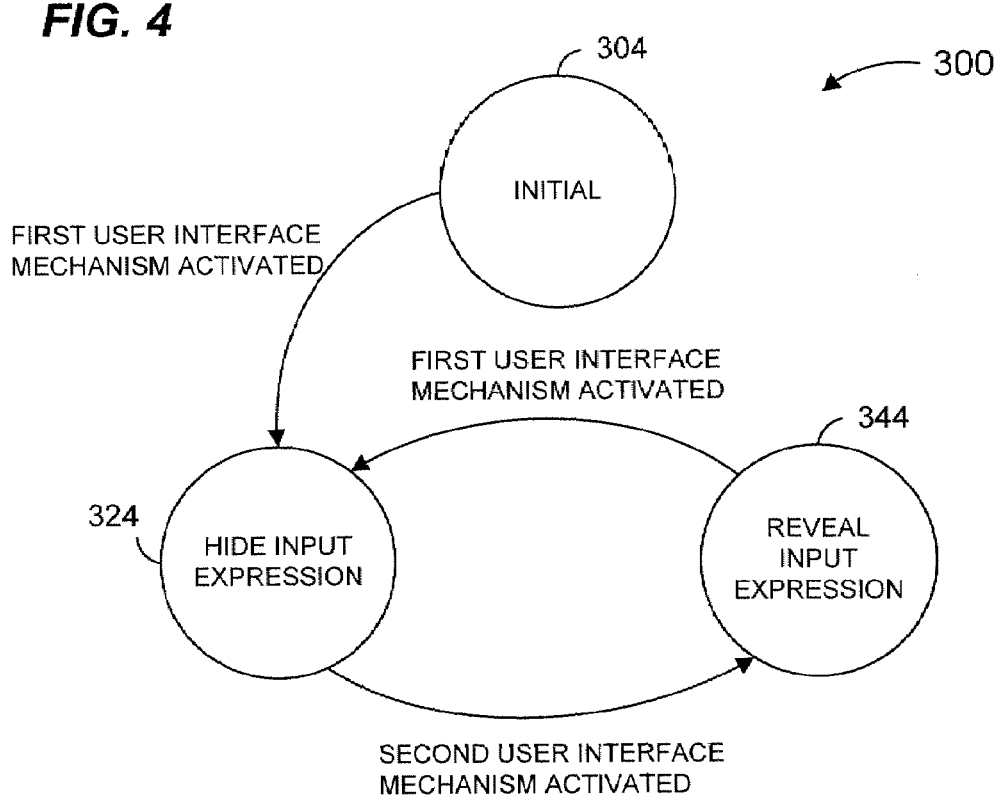
FIG. 4 is an example state diagram of a system for presenting information in a workspace associated with a computational software application.

FIG. 4 is an example state diagram of a system for presenting information in a workspace associated with a computational software application. In the context of the MATHEMATICA® software system, the workspace may be a notebook. The state diagram 300 will be described with reference to FIGS. 1, 3A, 3B, 5A, 5B, and 5C for ease of explanation. It is to be understood, however, that the state diagram 300 and the methods of FIGS. 5A, 5B, and 5C may be used in other contexts, such as with computational software applications other than the MATHEMATICA® software system.

Figure 5A:
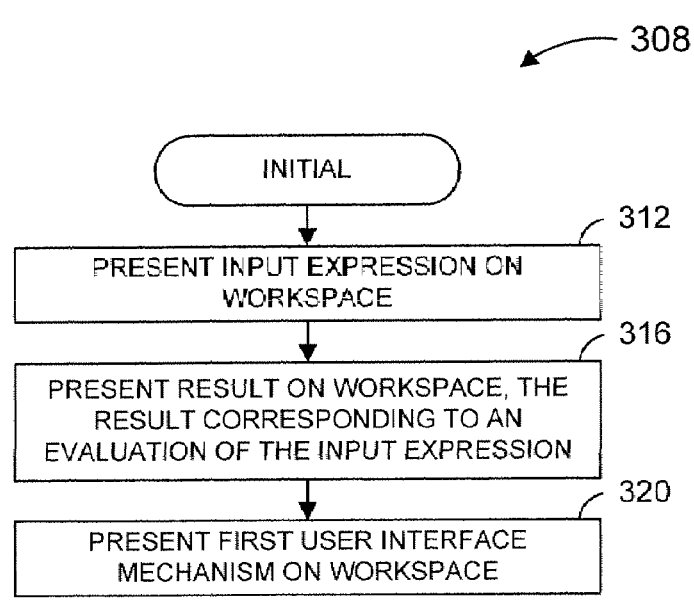
FIG. 5A is a flow diagram of an example method that may be implemented in the Initial state of FIG. 4.

Referring now to FIG. 4, the system begins in an "Initial" state 304. The Initial state 304 may be entered, for example, in response to a user entering a version of the input expression. In the context of the MATHEMATICA® software system, this may include typing the version of the input expression into the notebook and then pressing "Shift-Enter." FIG. 5A is a flow diagram of an example method 308 that may be implemented when the system is in the Initial state 304. At a block 312, an input expression may be presented on the workspace. Referring to FIG. 3A, the input expression 216 is presented on the notebook 200. At a block 316, a result corresponding to an evaluation of the input expression may be presented on the workspace. Referring to FIG. 3A, the graphic 220 corresponds to an evaluation of the input expression 216, and the graphic 220 is presented on the notebook 200. Referring to FIG. 1, the graphic 220 may be generated by the kernel 104, which sends the graphic 220 to the front end 108 for presentation. This may be in response to the front end 108 sending a version of the input expression 216 to the kernel 104 for evaluation.

At a block 320, a first GUI mechanism associated with the input expression may be presented on the workspace. Referring to FIG. 3A, the bracket 208 corresponds to the first GUI mechanism. As described previously, the bracket 208 is associated with the input expression 216 at least because activating the bracket 208 results in the input expression 216 being hidden in the notebook 200. The bracket 208 may be presented also in response to the user typing the version of the input expression 216 and then pressing "Shift-Enter." Any of a variety of GUI mechanisms may be utilized, such as a button, an icon, a pull-down menu, etc., associated with the input expression and/or the result. If a pull-down menu is utilized, presenting the GUI mechanism may comprise presenting the pull-down menu in response to a pointer being passed over the input expression, the result, an icon associated with the input expression and/or the result, etc., for example. As another example in which a pull-down menu is utilized, presenting the GUI mechanism may comprise presenting the pull-down menu in response to a pointer being moved over the input expression, over the result, over an icon associated with the input expression and/or the result, etc., and then "right-clicking" using a mouse, trackball, etc.

Referring again to FIG. 4, if the first GUI mechanism is activated, the system may transition to an "Hide Input Expression" state 324. Referring to FIG. 3A, the bracket 208 GUI mechanism may be activated by moving a pointer over the bracket 208 and, for example, "double-clicking" using a left button of a mouse. In general, the first GUI mechanism may be activated in any number of ways, and activation techniques may depend on the type of GUI mechanism employed. For example, if the first GUI mechanism is a button, it may be activated by moving a pointer over the button and then selecting the button with a single-click of a mouse, a touch of a touch pad, etc. If a touch screen is utilized, the button may be selected by simply touching the button with a finger or a stylus. If a pull-down menu is utilized, the first GUI mechanism may be activated by selecting an appropriate item in the menu. For example, the menu may include an item such as "Hide Input" or the like.

Figure 5B:
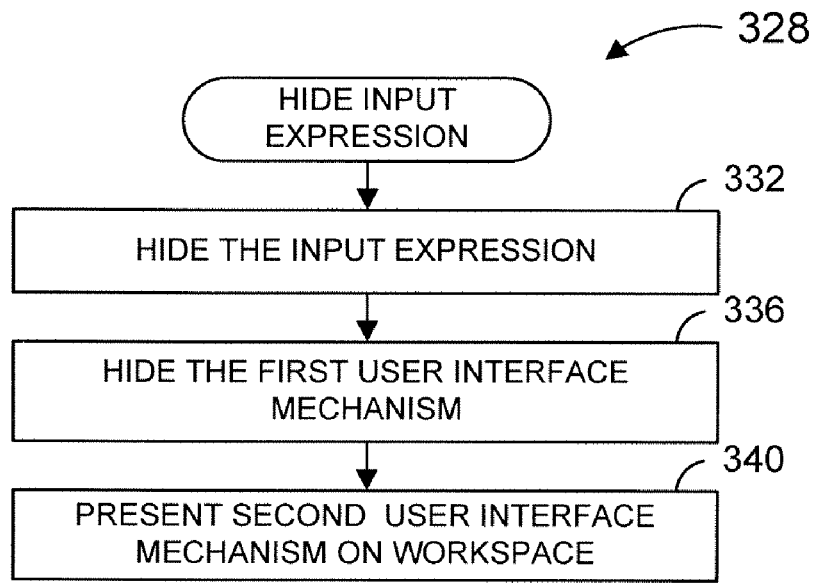
FIG. 5B is a flow diagram of an example method that may be implemented in the Hide Input Expression state of FIG. 4.

FIG. 5B is a flow diagram of an example method 328 that may be implemented when the system is in the Hide Input Expression state 324. At a block 332, the input expression may be hidden in the workspace. Hiding the input expression in the workspace may be implemented using a variety of techniques, including techniques known to those of ordinary skill in the art. Referring to FIGS. 3A and 3B, it can be seen that the input expression 216 was hidden in response to activation of the first GUI mechanism.

At a block 336, the first GUI mechanism optionally may be hidden. For example, if the first GUI mechanism is a button, an icon, a bracket, etc., the first GUI mechanism may be hidden on the workspace after it has been activated. It is to be understood, however, that the block 324 is optional. Referring to FIGS. 3A and 3B, for example, it can be seen that the bracket 208 (an example of the first GUI mechanism) was not hidden in response to activation of the first GUI mechanism. In some implementations, the first GUI mechanism may change from a first state to a second state in response to activation of the first GUI mechanism. For example, the first state may be state in which the first GUI mechanism is capable of being activated, and the second state may be state in which it is incapable of being activated. With a pull-down menu, for example, an item such as a "Hide Input" item may be "grayed-out" in response to a previous selection of the "Hide Input" item.

At a block 340, a second GUI mechanism associated with the input expression may be presented on the workspace. Referring to FIG. 3B, the bracket 212B corresponds to the second GUI mechanism. As described previously, the bracket 212B is associated with the input expression 216 at least because activating the bracket 212B results in the input expression 216 being revealed in the notebook 200. Any of a variety of GUI mechanisms may be utilized, such as a bracket, a button, an icon, a pull-down menu, etc., associated with the input expression and/or the result. The second GUI mechanism may be presented in response to various events. For instance, the second GUI mechanism may be presented in response to activation of the first GUI mechanism. Referring to FIGS. 3A and 3B, for example, the bracket 212B may be presented in response to user-activation of the bracket 208. In general, what initiates presentation of the second GUI mechanism may depend on the type of GUI mechanism that is employed. For example, if a pull-down menu is utilized, presenting the second GUI mechanism may comprise presenting the pull-down menu in response to a pointer being passed over the result or an icon associated with the input expression and/or the result, etc., for example. As another example in which a pull-down menu is utilized, presenting the second GUI mechanism may comprise presenting the pull-down menu in response to a pointer being moved over the result or an icon associated with the input expression and/or the result, etc., and then "right-clicking" using a mouse, trackball, etc.

Referring again to FIG. 4, if the second GUT mechanism is activated, the system may transition to an "Reveal Input Expression" state 344. Referring to FIG. 3B, the bracket 212B GUT mechanism may be activated by moving a pointer over the bracket 212B and, for example, "double-clicking" using a left button of a mouse. In general, the second GUT mechanism may be activated in any number of ways, and activation techniques may depend on the type of GUT mechanism employed. For example, if the second GUT mechanism is a button, it may be activated by moving a pointer over the button and then selecting the button with a single-click of a mouse, a touch of a touch pad, etc. If a touch screen is utilized, the button may be selected by simply touching the button with a finger or a stylus. If a pull-down menu is utilized, the second GUT mechanism may be activated by selecting an appropriate item in the menu. For example, the menu may include an item such as "Show Input" or the like.

Figure 5C:
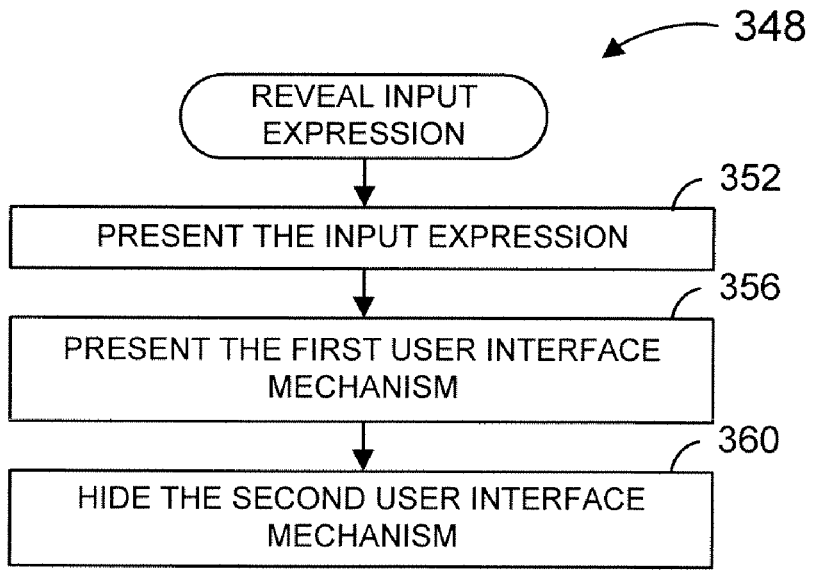
FIG. 5C is a flow diagram of an example method that may be implemented in the Reveal Input Expression state of FIG. 4.

FIG. 5C is a flow diagram of an example method 348 that may be implemented when the system is in the Reveal Input Expression state 344. At a block 352, the input expression may be presented again in the workspace. As discussed above with reference to FIGS. 3A and 3B, the input expression 216 is presented in response to activation of the second GUT mechanism (bracket 212B) so that the appearance of the notebook is as in FIG. 3A.

At a block 356, the first GUT mechanism is again presented on the workspace. This may be accomplished in the same manner as, or in a manner similar to, the techniques described above with respect to the block 316 of FIG. 5A. As discussed above with reference to FIGS. 3A and 3B, the first GUI mechanism 208 is presented in response to activation of the second GUI mechanism (bracket 212B) so that the appearance of the notebook is as in FIG. 3A.

At a block 360, the second GUI mechanism optionally may be hidden. For example, if the second GUI mechanism is a button, an icon, a bracket, etc., the second GUI mechanism may be hidden on the workspace after it has been activated. It is to be understood, however, that the block 360 is optional. In some implementations, the second GUI mechanism may change from a first state to a second state in response to activation of the second GUI mechanism. For example, the first state may be state in which the second GUI mechanism is capable of being activated, and the second state may be state in which it is incapable of being activated. With a pull-down menu, for example, an item such as a "Show Input" item may be "grayed-out" in response to a previous selection of the "Show Input" item. Referring to FIGS. 3A and 3B, it can be seen that the bracket 212B (an example of the second GUI mechanism) is replaced by the bracket 212A in FIG. 3A.

It is to be understood that the systems and methods corresponding to FIGS. 4, 5A, 5B, and 5C may be modified. For example, the first GUI mechanism and the second GUI mechanism could be different states of a single GUI mechanism. As an example, if the first GUI mechanism and the second GUI mechanism were a single button, activation of the button while in the "Hide Input Expression" state 324 may cause the system to transfer to the "Reveal Input Expression" state 344, and activation of the button while in the "Reveal Input Expression" state 344 may cause the system to transfer to the "Hide Input Expression" state 324. As another example, if the first GUI mechanism and the second GUI mechanism were a pull-down menu, in the "Hide Input Expression" state 324, the menu may include a "Show Input" item, and may also include a "Hide Input" item that is "grayed-out." Similarly, in the "Reveal Input Expression" state 344, the menu may include the "Show Input" item grayed-out, and may include the "Hide Input" item but no longer "grayed-out."

Generally speaking, the examples of the first GUI mechanism and the second GUI mechanism described herein may be any of a variety of activatable graphical user interface mechanisms, including activatable graphical user interface mechanisms currently known to those of ordinary skill in the art. The result corresponding to an evaluation of the input expression may be a numeric expression, a symbolic expression, a plot, a chart, a table, a graphic, etc.

Figure 6A:
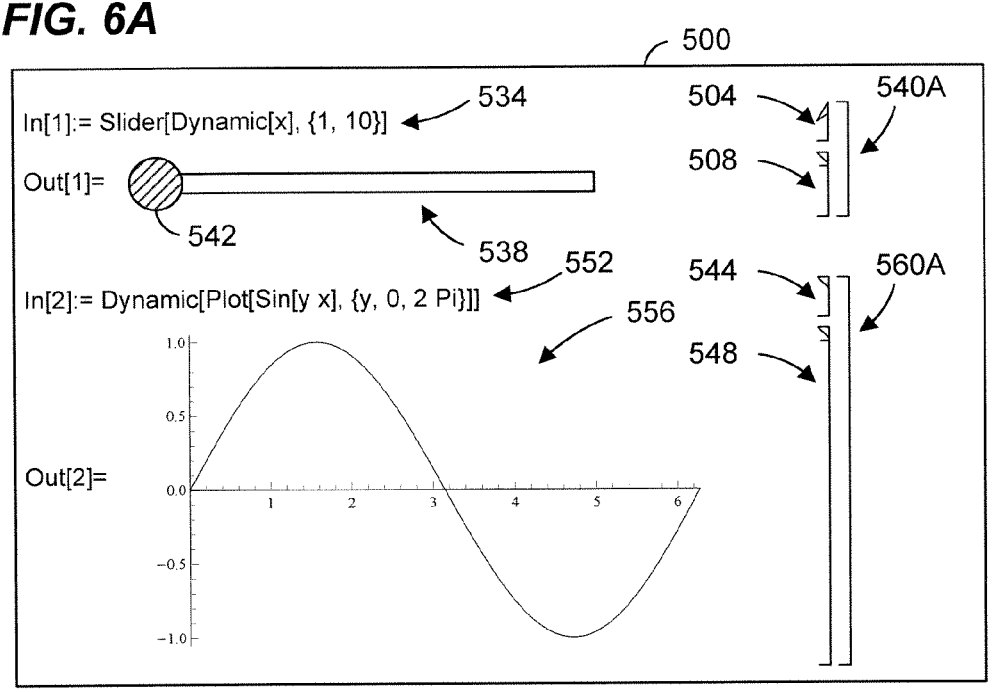
FIG. 6A is an illustration of an example notebook having graphical user interface mechanisms that can be used to hide input expressions associated with dynamic objects.

The result may also be a dynamic object such as described in U.S. patent application Ser. No. 11/234,550, entitled "Method of Dynamically Linking Objects Operated On By Computational System," filed on Sep. 23, 2005, which is hereby incorporated by reference herein in its entirety. For example, FIG. 6A is an illustration of a notebook 500 that includes results that are dynamic objects. The notebook 500 includes a first input cell indicated by a bracket 504 and a first output cell indicated by a bracket 508. The first input cell includes an input expression 534 that specifies a slider is to be created, where a position of a knob of the slider is to be a dynamic object "Dynamic[x]". The computational software system evaluated the expression 534 and generated a slider 538 having a knob 542. The knob 542 is in a position corresponding to 1. The slider 538 is in the output cell corresponding to the bracket 508. A bracket 540A indicates that the cells corresponding to the brackets 504 and 508 are related.

The notebook 500 also includes a second input cell indicated by a bracket 544 and a second output cell indicated by a bracket 548. The first input cell includes an input expression 552 that specifies another dynamic object to be created: a plot 556. The plot 556 is of the function "Sin[y x]" for values of y between 0 and 2π. Because the plot 556 specified by the input expression 552 is to be a dynamic object, the computational software system may update the plot 556 upon changes in any underlying objects. In this case, the variable x may be changed via the slider 538. The computational software system may evaluate the expression 552 and generate the plot 556, which corresponds to a plot of Sin[x y] where x=1. The plot 556 is in the output cell corresponding to the bracket 558. A bracket 560A indicates that the cells corresponding to the brackets 544 and 548 are related.

In the example notebook 500, the bracket 508 is a GUI mechanism that is associated with the input expression 534. A user can activate the bracket 508 by, for example, double clicking on the bracket 508. In response to activation of the bracket 508, the cell corresponding to the bracket 504 (i.e., the cell including the input expression 534) is hidden in the notebook 500. In this sense at least, the bracket 508 is associated with the input expression 534. Additionally, the bracket 508 is associated with the slider 538 at least because the bracket 508 is associated with the input expression 534 which is in turn associated with the slider 538, and/or because it indicates the output cell that includes the slider 538.

Similarly, the bracket 548 is a GUI mechanism that is associated with the input expression 552. A user can activate the bracket 548 by, for example, double clicking on the bracket 548. In response to activation of the bracket 548, the cell corresponding to the bracket 544 (i.e., the cell including the input expression 552) is hidden in the notebook 500. In this sense at least, the bracket 548 is associated with the input expression 552. Additionally, the bracket 548 is associated with the plot 556 at least because the bracket 548 is associated with the input expression 552 which is in turn associated with the plot 556, and/or because it indicates the output cell that includes the plot 556.

Figure 6B:
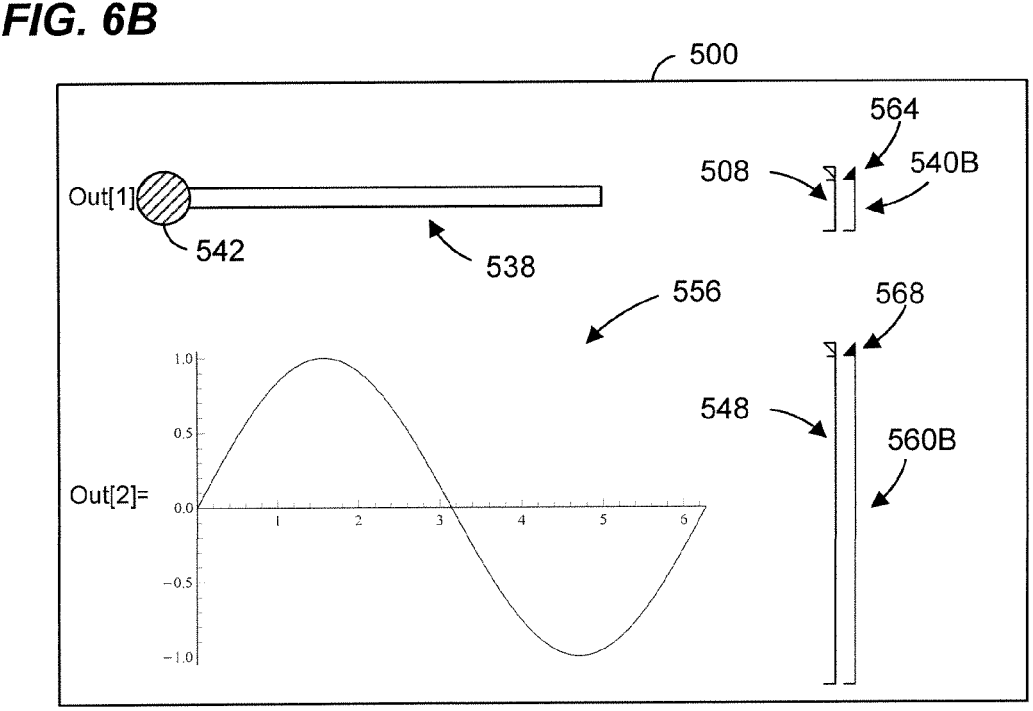
FIG. 6B is an illustration of the example notebook of FIG. 6A after the graphical user interface mechanisms were activated.

FIG. 6B is an illustration of the portion of the example notebook 500 after a user activated the bracket 504 and activated the bracket 544. As can be seen in FIG. 6B, the cell corresponding to the bracket 504, as well as the bracket 504 itself, is no longer visible in the notebook 500. For instance, the expression 534 is no longer visible. In this manner, a user can readily hide the input expression needed to generate the slider 538. Similarly, the cell corresponding to the bracket 544, as well as the bracket 544 itself, is no longer visible in the notebook 500. For instance, the expression 552 is no longer visible. In this manner, a user can readily hide the input expression needed to generate the plot 556. Thus, a user can focus their attention on the slider 538 and the plot 556 as opposed to the input expressions used to generate the slider 538 and the plot 556. This also may be useful, for example, if a user wants to reduce the size of the notebook 500.

In addition, the notebook 500 as illustrated in FIG. 6B includes a bracket 540B. The bracket 540B includes an indicator 564 that indicates there is a hidden input cell associated with the slider 538. Additionally, the bracket 540B is a GUI mechanism that may be activated by, for example, double clicking on the bracket 540B. In response to activation of the bracket 540B, the cell corresponding to the bracket 504 (i.e., the cell including the input expression 534) may be revealed in the notebook 500. For example, the input cell/output cell pair corresponding to the brackets 504 and 508 may then appear as in FIG. 6A. In this sense at least, the bracket 540B is associated with the input expression 534. Additionally, the bracket 540B is associated with the slider 538 at least because the bracket 540B is associated with the input expression 534 which is in turn associated with the slider 538, and/or because it indicates the output cell that includes the slider 538.

Similarly, the notebook 500 as illustrated in FIG. 6B includes a bracket 560B. The bracket 560B includes an indicator 568 that indicates there is a hidden input cell associated with the plot 556. Additionally, the bracket 560B is a GUI mechanism that may be activated by, for example, double clicking on the bracket 560B. In response to activation of the bracket 560B, the cell corresponding to the bracket 544 (i.e., the cell including the input expression 552) may be revealed in the notebook 500. For example, the input cell/output cell pair corresponding to the brackets 544 and 548 may then appear as in FIG. 6A. In this sense at least, the bracket 560B is associated with the input expression 552. Additionally, the bracket 560B is associated with the plot 556 at least because the bracket 560B is associated with the input expression 552 which is in turn associated with the plot 556, and/or because it indicates the output cell that includes the plot 556.

Figure 6C:
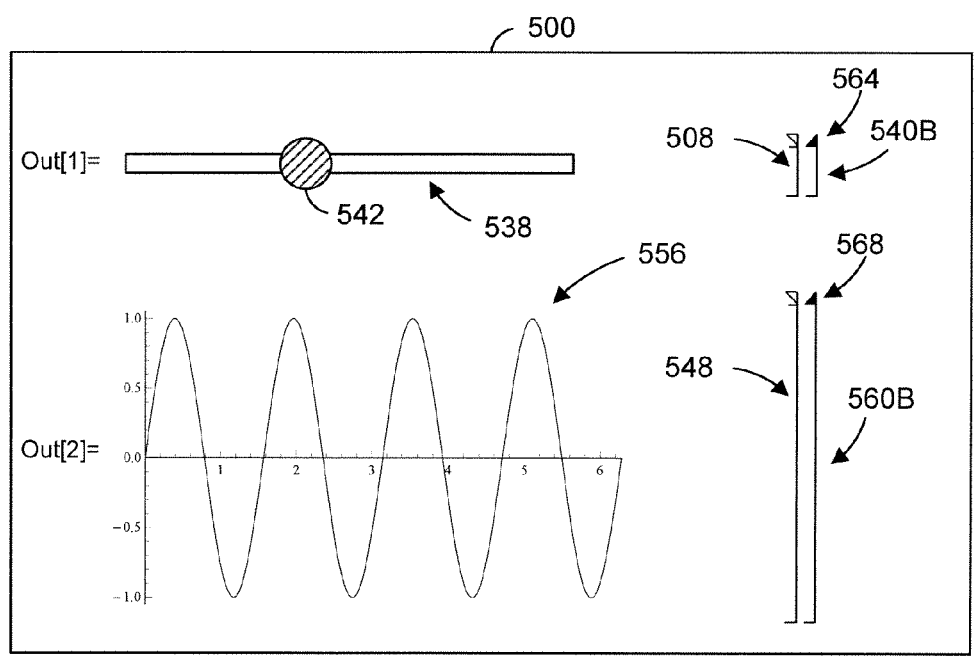
FIG. 6C is an illustration of the example notebook of FIG. 6B after a slider was moved.

FIG. 6C is an illustration of the notebook 500 illustrated in FIG. 6B after a user has moved the knob 542 to a position corresponding to 4. In response, the computational software system updated the value of x to 4. Further, the software system updated the plot 556 such that it corresponds to a plot of Sin[x y] where x=4. The computational software system may redraw the notebook 500 or a portion of the notebook 500 many times as the knob 542 is being moved by the user, and the plot 556 may rapidly change to indicate the changing values of x.

The techniques described above may be utilized in a variety of contexts. For example, they may be utilized in environments such as presentations, slideshows, online learning, collaboration systems, etc. The input expression used to generate a result may be included in the same presentation, slideshow, etc., document, but may be selectively hidden so that the presentation, slideshow, etc. is easier to follow. GUI mechanisms allow the input expressions to be seen and hidden as desired. For example, if a reader wants to see how a particular result was generated, the reader can use a GUI mechanism to reveal the input expression. If the reader is not interested in seeing the specific input expression used to generate a result, it can remain hidden and thus not clutter the presentation, slideshow, etc.

Figure 7A:
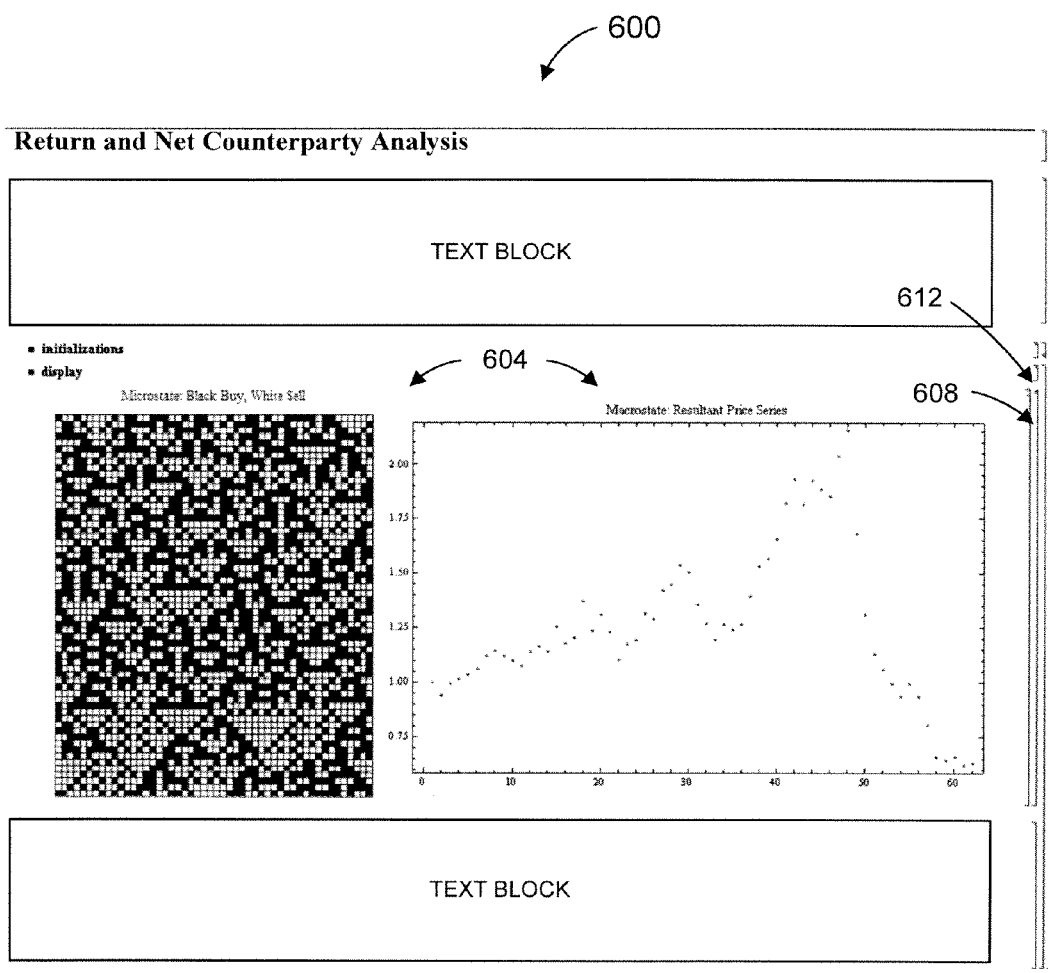
FIG. 7A is an illustration of an example presentation having plots and a hidden input expression used to generate the plots.
Figure 7B:
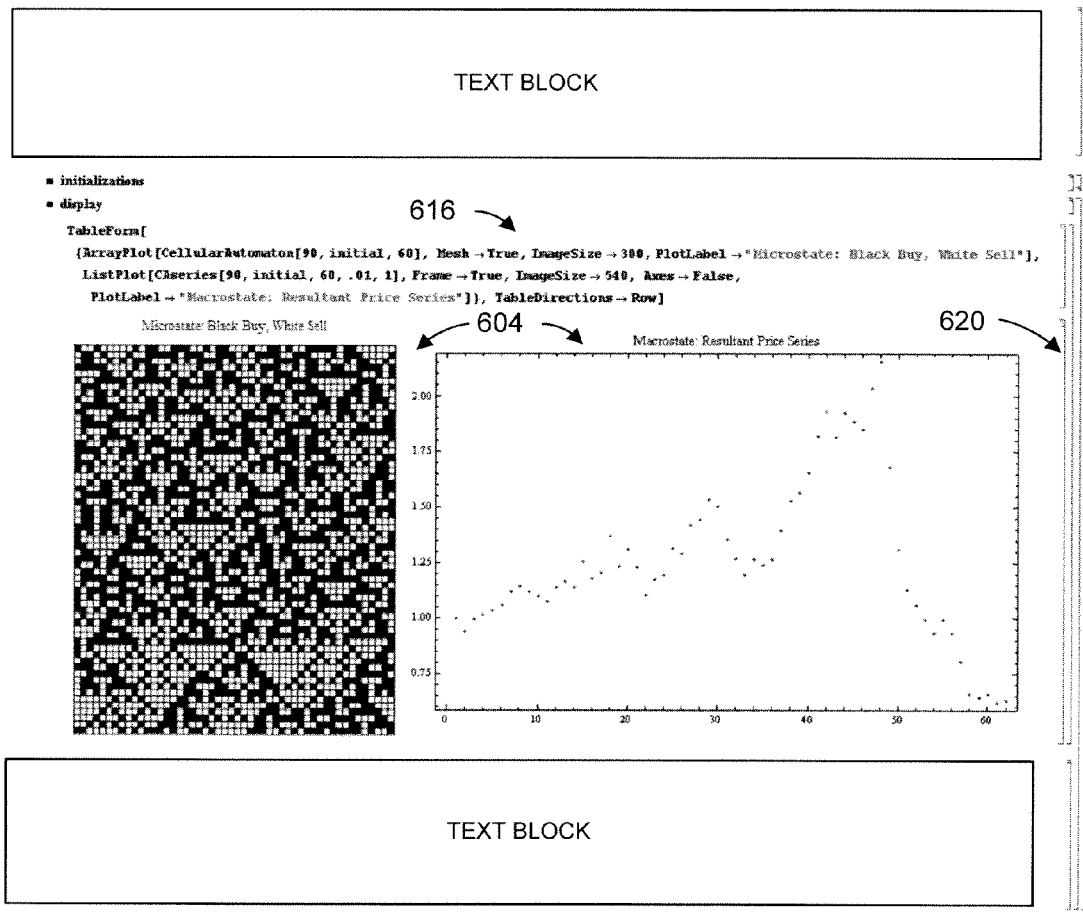
FIG. 7B is an illustration of the example presentation of FIG. 7A with the input expression unhidden.

FIG. 7A is an illustration of a portion of a presentation document 600 that includes plots 604 and a hidden input expression used to generate the plots 604. The presentation document 600 includes a bracket 608 having an indicator 612 that indicates there is a hidden input cell associated with the plots 604. Additionally, the bracket 608 is a GUI mechanism that may be activated by, for example, double clicking on the bracket 608. In response to activation of the bracket 608, the input expression corresponding to the bracket 608 may be revealed in the presentation document. FIG. 7B is an illustration of the presentation document 600 after the bracket 608 was activated. The presentation document 600 now shows an input expression 616 that was used to generate the plots 604. Also, the presentation document 600 now includes a bracket 620 that can be used to hide the input expression 616 so that the presentation document 600 again appears as in FIG. 7A.

Referring again to FIG. 1, in another implementation, the kernel 104 may comprise a server application such as web server and the front end 108 may comprise a client user interface application such as a web browser. In such an implementation, the workspace may be a web page, and the input expression, the result, the first GUI mechanism, and the second GUI mechanism can be represented by formatted expressions such as an extensible markup language (XML) data structures. Thus a GUI mechanism could be an XML data structure. In this implementation, when a web page is to be changed (e.g., to hide an input expression, to present a GUI mechanism, etc.), the web server could change, remove, or add new XML objects in the web page and then cause the web browser to display an indication of the updated web page. For example, the web server could send a refreshed page to the web browser or cause a portion of the page being displayed to the user to be updated. Extensible Style Language Transformation (XSLT) techniques could be utilized to change, remove, or add new XML objects.

Any of the techniques described above, including the blocks described with reference to FIGS. 4, 5A, 5B, and 5C, may be implemented using software comprising computer program instructions. Such computer program instructions may control the operation of a computing device such as a desktop computer, a laptop computer, a tablet computer, a workstation, a server, a mainframe, a cellular phone, a telephone, a set top box, a PDA, etc. The computing device may have a memory in which the computer program instructions may be stored. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

It is to be understood that, although examples were discussed in the context of the MATHEMATICA® software system, the techniques described above can be used with other computational software applications as well. Additionally, it is to be understood that the computational software application need not utilize an interpretive language, such as with the MATHEMATICA® software system. Rather, the above-described techniques may be used with a variety of types of computational software applications, including applications that utilize compilation, for example. In general, a computational software application evaluates input expressions to generate results, and this may include, optionally, interpretation and/or compilation.

While many methods and systems have been described herein as being implementable in software, they may be implemented in hardware, firmware, etc., and may be implemented by a variety of computing systems and devices. Thus, the method blocks and systems described herein may be implemented in a standard multi-purpose central processing unit (CPU), a special purpose CPU, or on specifically designed hardware or firmware such as an application-specific integrated circuit (ASIC) or other hard-wired device as desired. When implemented in software, the software routine may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor, in any database, etc. Likewise, this software may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure.

What is claimed is:

1. A method for presenting information, the method comprising the acts of:
   presenting an input expression on a workspace associated with a computational software application;
   presenting on the workspace a result that is an evaluation of the input expression by the computational software application, while presenting on the workspace the input expression;
   presenting on the workspace a first user interface mechanism associated with the input expression, while presenting on the workspace the result;
   hiding on the workspace the input expression, while presenting on the workspace the result, in response to an activation of the first user interface mechanism, wherein hiding the input expression reduces the size of the workspace as compared to when both the input expression and the result are presented on the workspace;
   presenting on the workspace a second user interface mechanism associated with the input expression; and
   presenting on the workspace the input expression in response to an activation of the second user interface mechanism, while presenting on the workspace the result.

2. The method according to claim 1, wherein the first user interface mechanism and the second user interface mechanism are different user interface mechanisms.

3. The method according to claim 2, further comprising:
   changing a state of the first user interface mechanism in response to the activation of the first user interface mechanism;
   changing a state of the second user interface mechanism in response to the activation of the first user interface mechanism;
   changing the state of the first user interface mechanism in response to the activation of the second user interface mechanism;
   changing the state of the second user interface mechanism in response to the activation of the second user interface mechanism.

4. The method according to claim 3, wherein changing the state of the first user interface mechanism in response to the activation of the first user interface mechanism comprises changing the state of the first user interface mechanism to a state in which the first user interface mechanism cannot be activated;
   wherein changing the state of the second user interface mechanism in response to the activation of the first user interface mechanism comprises changing the state of the second user interface mechanism to a state in which the second user interface mechanism can be activated;
   wherein changing the state of the first user interface mechanism in response to the activation of the second user interface mechanism comprises changing the state of the first user interface mechanism to a state in which the first user interface mechanism can be activated;
   wherein changing the state of the second user interface mechanism in response to the activation of the second user interface mechanism comprises changing the state of the second user interface mechanism to a state in which the second user interface mechanism can be activated.

5. The method according to claim 3, further comprising:
   hiding on the workspace the first user interface mechanism in response to the activation of the first user interface mechanism;
   wherein the act of presenting on the workspace the second user interface mechanism is in response to the activation of the first user interface mechanism;
   hiding on the workspace the second user interface mechanism in response to the activation of the second user interface mechanism; and
   presenting on the workspace the first user interface mechanism in response to the activation of the second user interface mechanism.

6. The method according to claim 1, wherein the first user interface mechanism and the second user interface mechanism are a first state and a second state, respectively, of a single user interface mechanism;
   wherein the method further comprises:
   changing the state of the single user interface mechanism from the first state to the second state in response to the activation of the first user interface mechanism;
   changing the state of the single user interface mechanism from the second state to the first state in response to the activation of the second user interface mechanism.

7. The method according to claim 1, further comprising the acts of:
   passing the input expression to a kernel; and
   receiving the result from the kernel.

8. The method according to claim 1, further comprising the act of evaluating the input expression to generate the result.

9. The method according to claim 7, wherein passing the input expression to the kernel comprises transmitting the input expression over a communication network.

10. The method according to claim 1, wherein the computational software application comprises at least one of:
    a software application capable of evaluating symbolic expressions;
    a spreadsheet application;
    a control system application;
    an instrument application;
    a simulation application;
    an interactive game application;
    a presentation application;
    a slide show application;
    a document collaboration application.

11. The method according to claim 1, wherein the user interface mechanism comprises one of a bracket, a button, an icon, or a pull-down menu.

12. The method according to claim 1, wherein the input expression is a symbolic expression.

13. The method according to claim 1, wherein presenting the result comprises presenting at least one of a numeric expression, a symbolic expression, a plot, a chart, a table, a graphic, or a dynamic object.

14. The method according to claim 1, wherein the workspace is one of a notebook, a spreadsheet, or a slide.

15. The method of claim 1, wherein the first interface mechanism is disposed next to the input expression.

16. A non-transitory computer readable storage medium having stored thereon machine executable instructions, the machine executable instructions capable of causing the machine to:
    present an input expression on a workspace associated with a computational software application;
    present on the workspace a result that is an evaluation of the input expression by the computational software application, while the input expression is presented on the workspace;
    present on the workspace a first user interface mechanism associated with the input expression, while the result is presented on the workspace;

hide on the workspace the input expression, while the result is presented on the workspace, in response to an activation of the first user interface mechanism, wherein hiding the input expression reduces the size of the workspace as compared to when both the input expression and the result are presented on the workspace;

present on the workspace a second user interface mechanism associated with the input expression; and restore on the workspace the hidden input expression in response to an activation of the second user interface mechanism, while the result is presented on the workspace.

17. A method for presenting information, the method comprising the acts of:

presenting an input cell on a workspace associated with a computational software application, the input cell including an input expression;

presenting on the workspace an output cell including a result that is an evaluation of the input expression by the computational software application, while presenting on the workspace the input cell;

presenting on the workspace a first user interface mechanism associated with the input cell, while presenting on the workspace the output cell;

hiding on the workspace the input cell, while presenting on the workspace the output cell, in response to an activation of the first user interface mechanism, wherein hiding the input cell reduces the size of the workspace as compared to when both the input cell and the output cell are presented on the workspace;

presenting on the workspace a second user interface mechanism associated with the input cell; and presenting on the workspace the input cell in response to an activation of the second user interface mechanism, while presenting on the workspace the output cell.

18. The method according to claim 17, wherein the first user interface mechanism and the second user interface mechanism are different user interface mechanisms.

19. The method according to claim 18, further comprising:

changing a state of the first user interface mechanism in response to the activation of the first user interface mechanism;

changing a state of the second user interface mechanism in response to the activation of the first user interface mechanism;

changing the state of the first user interface mechanism in response to the activation of the second user interface mechanism;

changing the state of the second user interface mechanism in response to the activation of the second user interface mechanism.

20. The method according to claim 19, further comprising:

hiding on the workspace the first user interface mechanism in response to the activation of the first user interface mechanism;

wherein the act of presenting on the workspace the second user interface mechanism is in response to the activation of the first user interface mechanism;

hiding on the workspace the second user interface mechanism in response to the activation of the second user interface mechanism; and presenting on the workspace the first user interface mechanism in response to the activation of the second user interface mechanism.

21. The method according to claim 17, wherein the first user interface mechanism and the second user interface mechanism are a first state and a second state, respectively, of a single user interface mechanism;

wherein the method further comprises:

changing the state of the single user interface mechanism from the first state to the second state in response to the activation of the first user interface mechanism;

changing the state of the single user interface mechanism from the second state to the first state in response to the activation of the second user interface mechanism.

22. A non-transitory computer readable storage medium having stored thereon machine executable instructions, the machine executable instructions capable of causing the machine to:

present an input cell on a workspace associated with a computational software application, the input cell including an input expression;

present on the workspace an output cell including a result that is an evaluation of the input expression by the computational software application, while the input cell is presented on the workspace;

present on the workspace a first user interface mechanism associated with the input cell, while the output cell is presented on the workspace;

hide on the workspace the input cell, while the output cell is presented on the workspace, in response to an activation of the first user interface mechanism, wherein hiding the input cell reduces the size of the workspace as compared to when both the input cell and the output cell are presented on the workspace;

present on the workspace a second user interface mechanism associated with the input cell; and present on the workspace the input cell in response to an activation of the second user interface mechanism, while the output cell is presented on the workspace.

* * * * *